Dec. 23, 1924.

J. R. JACOBS

SAFETY LAMP

Filed Sept. 14, 1923

1,520,574

Inventor:
John R. Jacobs,
by Spear, Middleton, Donaldson & Hall
Attys.

Patented Dec. 23, 1924.

1,520,574

UNITED STATES PATENT OFFICE.

JOHN ROSZELL JACOBS, OF BLACKSBURG, VIRGINIA.

SAFETY LAMP.

Application filed September 14, 1923. Serial No. 662,664.

*To all whom it may concern:*

Be it known that I, JOHN R. JACOBS, a citizen of the United States, and a resident of Blacksburg, in the county of Montgomery and State of Virginia, have invented certain new and useful Improvements in Safety Lamps, of which the following is a specification.

My present invention relates to a safety lamp for automobiles or other vehicles.

The principal object of my invention is the provision of a lamp which may be mounted upon a vehicle in any desired position and of such a construction that the beams from said lamp are not visible to the driver of an approaching vehicle.

With this and other objects in view, my invention includes a lamp of the type described and includes a shield partially surrounding the jewel or glass in the front of the lamp which will screen the rays from the driver of an approaching car. This shield may be placed parallel to the axis of the lamp or out of parallel therewith, as circumstances will best determine. The lamp may be mounted upon the vehicle either parallel to the axis of the vehicle or not, as desired.

I have illustrated in the accompanying drawings a preferred form of device, but it is understood that this is merely illustrative of the principle involved and I do not wish to be limited to the exact instrumentalities employed therein.

In these drawings:—

Figure 1:
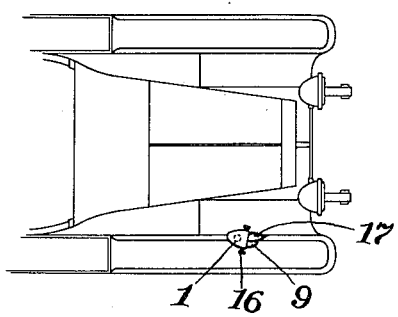
Figure 1 is a plan view of the front portion of an automobile in outline, with my safety lamp in place thereon.
Figure 2:
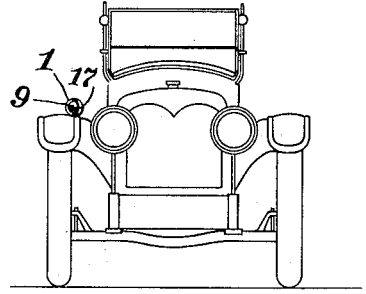
Fig. 2 is a front elevation of same.
Figure 3:
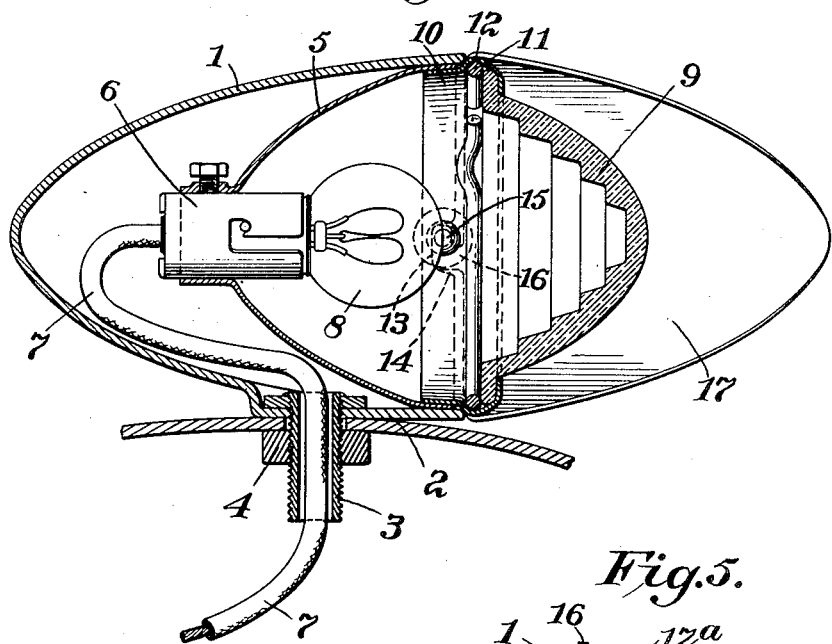
Fig. 3 is an enlarged vertical sectional view of the lamp attached to the fender.
Figure 4:
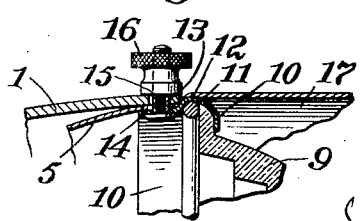
Fig. 4 is a fragmental detail of certain of the parts.
Figure 5:
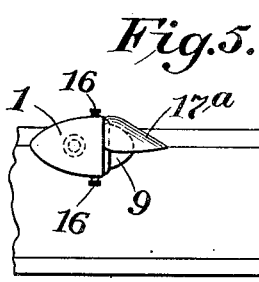
Fig. 5 is a plan view of a slightly modified form.

Referring now to the embodiment illustrated, I show a casing 1 of any desired form, but for the sake of appealing to the esthetic taste of the purchaser I have shown this to be of torpedo or substantially conical shape. This casing may be provided with means for attaching the same to a vehicle and in the form illustrated is provided with a flattened portion 2 to which is screw threaded a tubular element 3 adapted to extend through the fender of an automobile, or the like. A nut 4 threaded to the member 3 is adapted to be placed beneath the fender, which thus securely clamps the lamp on the vehicle. The tubular element 3 is also adapted to receive the conduit wire from the electric light bulb, as will be more fully described hereinafter.

An ordinary parabolic reflector 5 having a socket receiving aperture therein is provided and to which is secured in any desired manner an electric light socket 6 having a lead wire 7 extending from the rear thereof through the tubular element 3 to a source of energy of the usual type, not shown. The other contact for the socket 6 is made on the side of the socket receiving aperture of the parabolic reflector and from thence to ground in the usual manner. An electric light bulb 8 is placed within the socket in the usual manner and circumstances will determine the best candle power and type of bulb to be used.

A front glass 9 is secured within a detachable rim 10 as by means of a spring clip 11 seated within groove 12 in the detachable rim. This rim is also provided with two screw threaded lugs 15 extending outwardly therefrom and adapted to enter slots 13 in the casing 1. The parabolic reflector is also provided with slots 14 adapted to coincide with the slots 13 in the casing to allow the lugs 15 to enter the said casing. Knurled nuts 16 threaded to the lugs 15 may then be screwed down upon the casing, which holds the assembly rigidly together and prevents accidental displacement.

The front glass 9 may take various forms, such as a colored or uncolored jewel, or one having an irregular interior to intensify or diffuse the light beams projected therethrough.

Secured to the lamp in any desired manner I provide a shield 17 which in this case is attached to the detachable rim 10. This shield may partially surround the lamp and extend in a direction substantially parallel to the axis of the lamp, or may take the form of the shield 17$^a$ out of parallel with the axis of the lamp and extending over toward the lamp axis. In either event, the lamp is to be so mounted on the vehicle that the rays of light projected through the glass or jewel will be invisible to the driver of the approaching vehicle. If the shield used is as shown at 17, it will be necessary to mount the lamp on the vehicle out of parallel with the axis of the vehicle, so that the lamp will cast a direct beam onto the side of the road to the right of the vehicle to which it is attached. If, however, the shield takes the form of that shown at 17ª, the lamp may be mounted parallel to the axis of the vehicle, in which case the rays of light passing through the glass or jewel will be deflected toward the road to the right of the vehicle to which the device is attached. In either case, however, the side of the road to the right of the vehicle is amply illuminated, and yet these rays are invisible to the driver of the approaching vehicle, with the result that when two vehicles pass each other on the road, the side of the road to which the driver of a vehicle must turn is illuminated, thus protecting him against accidents, yet at the same time the driver of the approaching vehicle is not blinded or annoyed by the lights of the other vehicle.

It will be found desirable to have the inner surface of the shield 17 or 17ª polished or coated so that a reflecting surface is produced, which will increase the light reaching the road.

While I have specifically mentioned that this safety lamp will be of great service on roads having curves or turns therein, and in passing other motorists or vehicles on the road, yet it will be apparent that this lamp may be used on straight roads, or in any location or circumstance where the driver of the vehicle wishes to illuminate the side of the road. By mounting a pair of lamps on the front fenders of an automobile with the shades in reverse relation to each other, both sides of the road may be illuminated, which will be an aid to the driver in making turns either to the right or to the left, or when travelling on a straight road, to show objects on either side, and at the same time prevent dazzling or annoying beams from reaching the driver of an approaching vehicle.

I claim:

In combination, a lamp including a housing, a parabolic reflector therein, a socket carrying an electric light bulb secured in the rear of said reflector,—detachable rim extending within and without the reflector, said rim carrying a front glass and a shield, said shield extending outwardly in front of said lamp partially obstructing the rays from said bulb.

In testimony whereof, I affix my signature.

JOHN ROSZELL JACOBS.